(No Model.) 3 Sheets—Sheet 1.
W. L. BUNDY.
ELECTRIC STATION INDICATING APPARATUS.
No. 358,645. Patented Mar. 1, 1887.
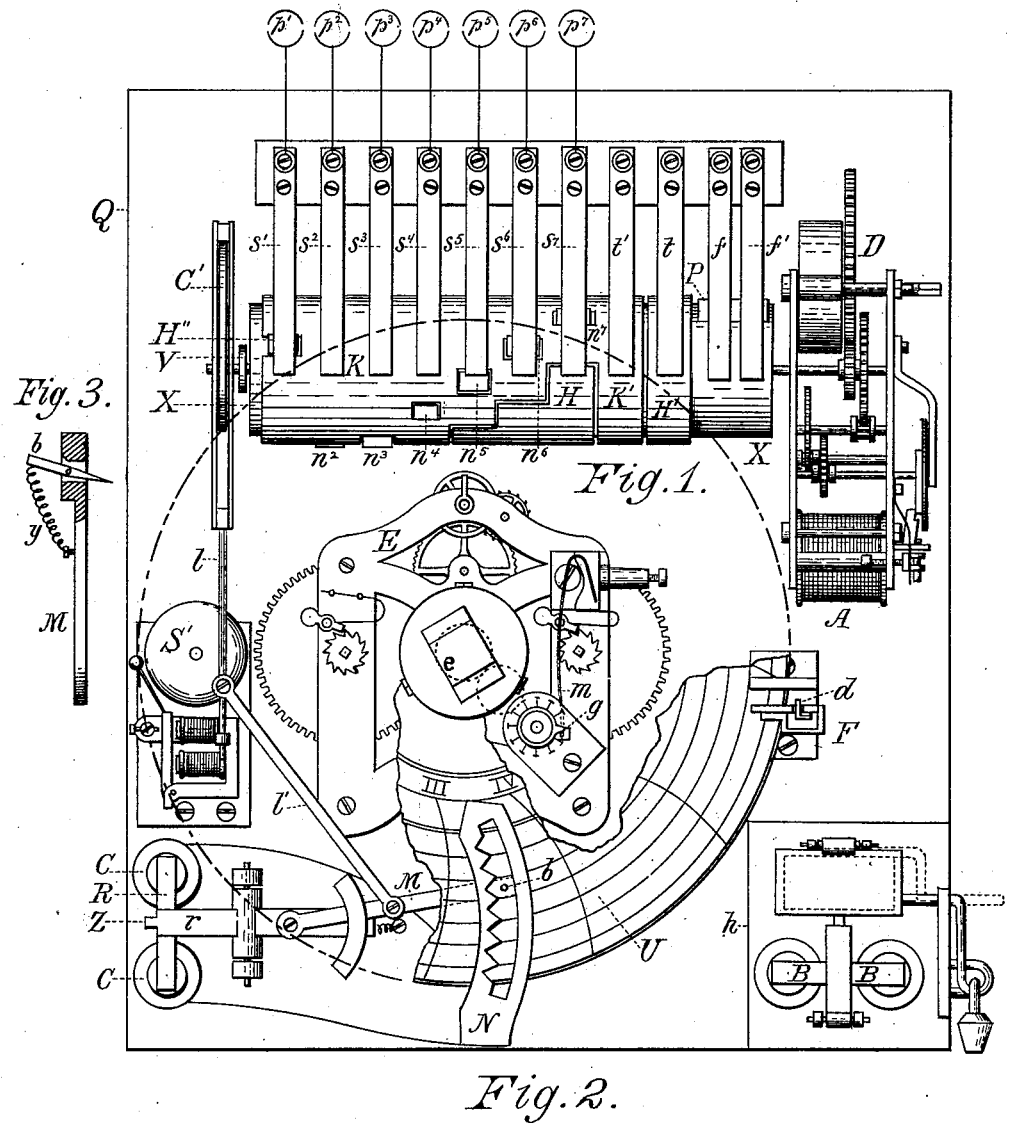
Fig. 3.
Fig. 1.
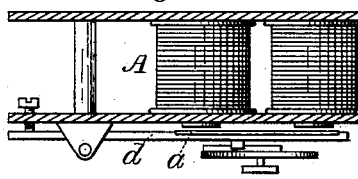
Fig. 2.
Witnesses:
William P. Allen
George S. O'Kelly
Inventor:
Willard L. Bundy
by Frederick J. Allen
Attorney.

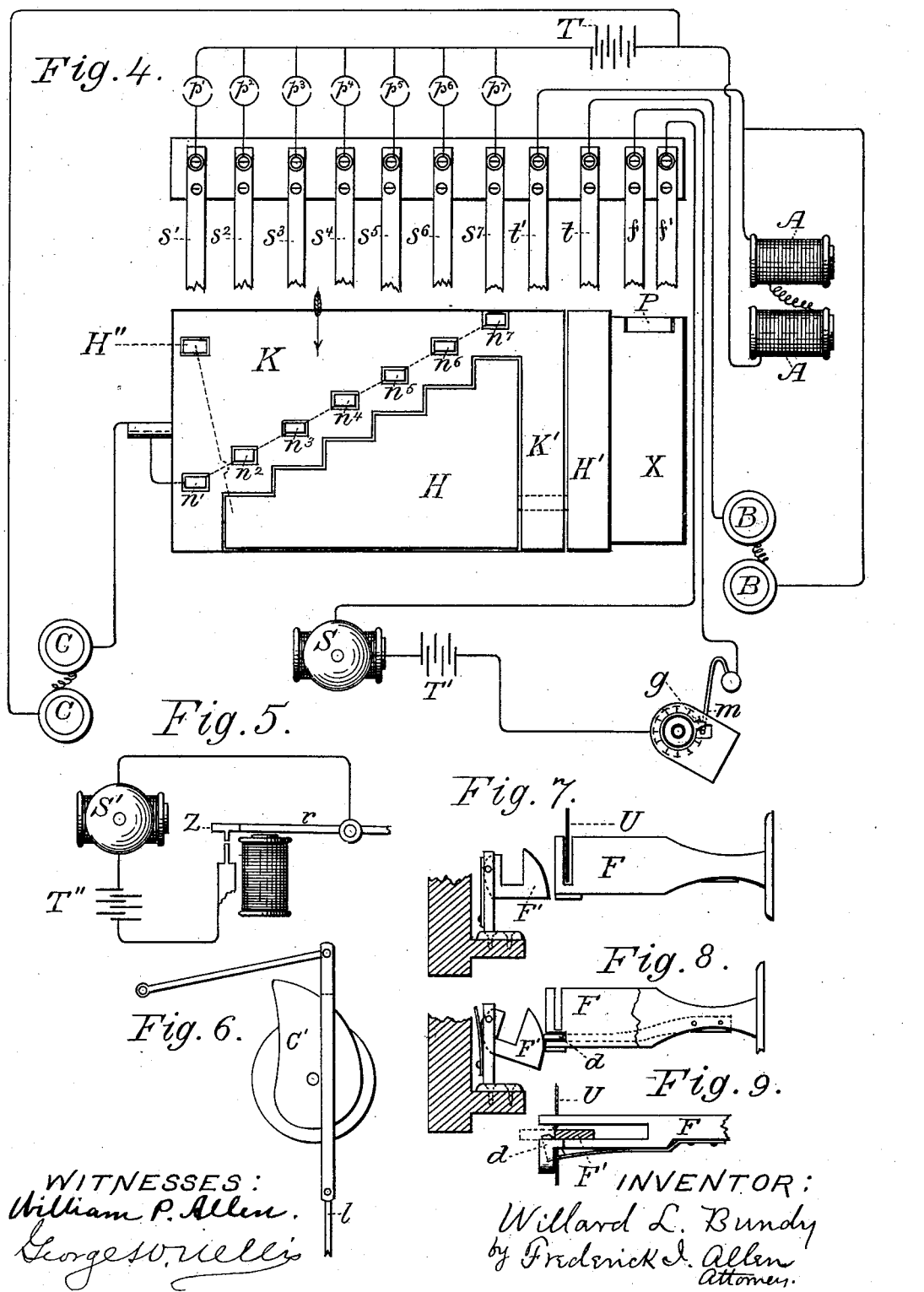

(No Model.) 3 Sheets—Sheet 3.

W. L. BUNDY.
ELECTRIC STATION INDICATING APPARATUS.

No. 358,645. Patented Mar. 1, 1887.

Witnesses:
William P. Allen
George Underwood

Inventor:
Willard L. Bundy
by Frederick J. Allen
Attorney.

N. PETERS, Photo-Lithographer, Washington, D. C.

UNITED STATES PATENT OFFICE.

WILLARD L. BUNDY, OF AUBURN, NEW YORK.

ELECTRIC STATION-INDICATING APPARATUS.

SPECIFICATION forming part of Letters Patent No. 358,645, dated March 1, 1887.

Application filed March 9, 1885. Serial No. 158,183. (No model.)

*To all whom it may concern:*

Be it known that I, WILLARD L. BUNDY, of the city of Auburn, New York, have invented certain new and useful Improvements in Electric Indicating Apparatus, of which the following is a description, reference being had to the accompanying drawings, in which—

Figure 10:
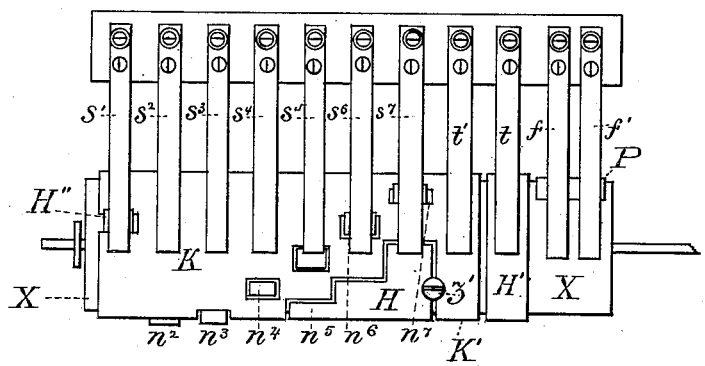
Figure 11:
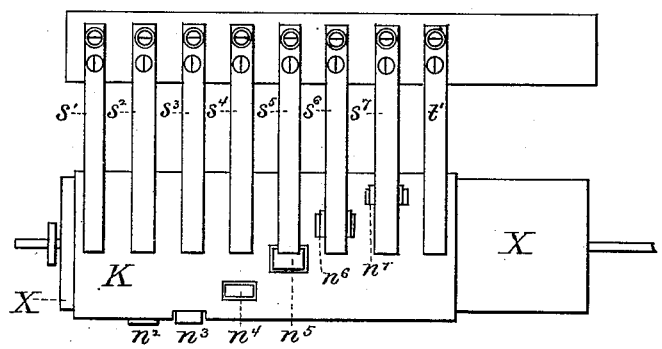

Figure 1 is a front view of my invention without its electrical conductors. Fig. 4 is a plan of the electrical connections; and Figs. 2, 3, 5, 6, 7, 8, and 9 are detail drawings to further illustrate particular parts. Figs. 10 and 11 are detail views showing modified forms of switch-cylinders.

My invention relates to that class of devices in which an electric signal is transmitted from one of two or more signaling-stations more or less distant to a central mechanism, which serves to identify the particular point or station from which the signal is sent; and it consists in mechanism adapted to accomplish this end.

It further consists in devices which serve to make a record of signals thus sent, which record may, if desired, also indicate the time of sending.

It further consists in certain devices which are not essential to its operation, but which serve as checks or safeguards against its irregular operation by giving notice or furnishing a record of such irregularities.

The above objects are attained by means of the mechanism hereinafter described.

An electric battery, T, Fig. 4, is connected by suitable wires with the stations from which signals are to be sent. These stations may be of any number from two upward, within reasonable limits, being restrained only by the mechanical difficulties of grouping their several connections around a switch, hereinafter described. The stations may be at any desired location or distance from the central instrument, regard being had to the resistance of their several connecting-wires.

At the signaling-stations $p'\ p^2\ p^3\ p^4\ p^5\ p^6\ p^7$, Figs. 1 and 4, the circuits from the battery T are normally broken, and the signal may be sent from any station by closing the circuit at that point.

The stations $p'\ p^2$, &c., are severally represented at the central instrument by the springs $s'\ s^2$, &c., with which they are connected, and which rest upon the cylinder-surface, hereinafter mentioned.

A motor, D, is provided with an escapement controlled by the armature of an electro-magnet, A, which magnet is normally in circuit with each of the stations $p'\ p^2$, &c., so that when a signal is sent in from any station, $p'\ p^2$, &c., the motor is started. For this motor I have shown an ordinary clock-movement; but I do not limit myself to this or any other particular construction of motor.

A switch mechanism is provided, one form of which is shown in the drawings, X X, consisting of a conducting-cylinder suitably supported upon its axis and adapted to be turned upon its axis by the motor D. Upon the extremity of this axis is a cam, C', turning with it, and which serves to adjust a punch-arm, M, by means of suitable connecting-rods, $l\ l'$.

The object of the switch and switch-motor is to enable the operator, by sending in a signal from any station, to start the motor, and thus adjust the movable punch or registering point to a position upon a dial which will indicate the station from which the signal is transmitted, and, having effected this adjustment, to switch the current away from the motor-governing magnet, thereby stopping the motor and sending the current to a registering-magnet, C, which operates the registering-arm M. For this purpose the switch may be constructed, as shown in the drawings, of a cylinder provided with a surface of conducting material which is in electrical communication with the motor-governing magnet A, and which constitutes one pole of the switch, the cylinder being further provided with a series of shunts, $n'\ n^2\ n^3\ n^4$, &c., all of which are electrically connected together, and are in communication with the registering-magnet C, constituting the other pole of the switch.

The line of shunts (I prefer to call it one shunt, having landings for the several springs $s'\ s^2$, &c.,) follows a spiral course upon the cylinder-surface, so that the springs $s'\ s^2$, &c., are successively shunted as the cylinder revolves, and are insulated from the rest of the conducting-surface of the cylinder. Now, solely for the purpose of using a safety appliance, which I am about to describe, which will give a record if any stations are skipped or if they are not used in the consecutive order in which they are numbered, I cut the conducting-surface of the cylinder into two portions—the plates K and H, Fig. 4—the portion or plate H being of the nearly triangular form shown in the drawings, and this plate is in electrical communication with the magnet A and the magnet B of an annunciator-drop.

For the purpose of making connections between the plates H and K and the magnet A, H is provided with an extension, H', extending entirely around the cylinder, and upon which the spring $t$ rests, and K is provided with a similar extension, K', and spring $t'$.

The tell-tale magnet B may be used or omitted from the mechanism, as desired, constituting, as it does, merely a safeguard to a regular operation of the machine, but being non-essential to its chief purpose, as will be seen from the following description of the operation of the foregoing mechanism.

If it is desired to omit (temporarily) the tell-tale magnet B, the plates K and H are simply brought into communication with each other, as by the screw $z'$, Fig. 10, and the magnet B then removed; or, if it is considered desirable to omit the tell-tale altogether from the mechanism, it will be unnecessary to separate the cylinder-surface into the two plates H and K; but the surface of the cylinder may consist of only the plate K, as shown in Fig. 11, and thereby the construction will be somewhat cheapened.

The operation of the above-described mechanism is as follows: The spring $s$ of the station $p$, from which, in the regular operation of the mechanism a signal should be next sent, rests in the position upon the cylinder-surface occupied by $s^6$ in Fig. 1, which position I term "resting" upon K before its shunt in the rotation of the cylinder. That this will always be true when the signals are sent from the stations in rotation will appear when it is considered that the cylinder is stopped by the shunting of the current from the motor-governing magnet A to the registering-magnet C, when the spring $s$ of the station from which the signal is sent rests upon its shunt $n$, as $s^5$ upon $n^5$ in Fig. 1. If, now, a signal is sent by closing the circuit at $p^6$, a current will be sent through $s^6$ to the plate K, and thence through K' and $t'$ to the motor-governing magnet A, which then starts the motor, and this latter revolves the cylinder X X until the spring $s^6$ rests upon its shunt $n^6$, when the circuit to the magnet A is broken and the current is switched to the registering-magnet C, which latter magnet operates the register or punch $b$, which has meanwhile been adjusted to its proper position upon the dial U by means of a cam, C', turning with the cylinder and the connecting mechanism $l\ l'$. In case the tell-tale magnet B is used and a signal should be sent in from a station ahead of the one to be normally next used for signaling, it will be seen that all such stations ahead are in connection with springs $s$, which rest upon the plate H, as $p^7$, Fig. 1, and the current will pass as from $p^7$ through H H' $t$, magnet B, (dropping the tell-tale) and magnet A, liberating the motor and revolving the cylinder until $s^7$ rests upon $n^7$, when the current is switched to the registering-magnet C, and this station is registered upon the dial U.

H'' is a portion of the plate H, upon which $s'$ rests when $s^6$ rests on its shunt $n^6$ and $s^7$ rests on K before its shunt in a seven-station machine.

The dial U is clamped by an ordinary clamp upon a clock-movement, E, and is divided into concentric rings representing the signaling-stations. The lower edge of the dial is placed between two supporting-arms, N, (one only showing in the drawings,) and the upper extremity of the front arm, N, serves to point time upon the dial, as shown in Fig. 1.

In order that a single registering marker or punch may be moved into positions corresponding with each signaling-station, I support it upon a swinging arm, M, and in order to prevent it from tearing or wrenching the dial from its clamp in case it should be held thrust through the dial, I pivot it to the arm M and support it in position by a spring, $y$, as shown in Fig. 3.

A very useful safety attachment for the purpose of giving an immediate alarm in case of any undue delay in signaling from the stations is composed of the battery T', in circuit with a call-bell, S, which circuit is broken between two contact-pieces, $f\ f'$, and also between a spring, $m$, and lug $g$. The lug $g$ revolves once in an hour, being driven from the minute-shaft of the clock E, and it is adjustable with easy friction, so that it may be set to make a contact with the spring $m$ (whose extremity projects forward to engage with it) at the even hours or at any desired number of minutes after the hour. The break in this circuit is closed between the contacts $f$ and $f'$ by a metallic lug or block, P, which is secured upon the cylinder X X, so as to bridge the space between $f$ and $f'$ when the station whose shunt $n$ it is in line with has been used to signal from, as $n^7$ in Fig. 4. With the lug P as shown in Fig. 4, the break will be closed between $f$ and $f'$ by P when a signal has been sent in from the last station, $p^7$.

Now, if station $p'$ is to be signaled from at the even hour, and the lug $g$ is set to close the circuit with $m$ at five minutes after the even hour, unless a signal is sent from $p'$ before the five minutes of allowable delay have elapsed, an alarm will be rung by the bell S. However, if a signal is sent from $p'$ before the allowable delay of five minutes (or other predetermined period) has elapsed, the cylinder X X will revolve and carry the lug P away from the contacts $f$ and $f'$, so that when the circuit is closed between $g$ and $m$ it will be broken between $f$ and $f'$, and no alarm will be rung by S.

The battery T'', Fig. 5, and call-bell S' are in a circuit normally broken, and which is closed at Z whenever the magnet C operates the registering-arm r M, so that an audible signal is given whenever any station is registered upon the dial U.

F, Figs. 1, 7, 8, 9, is a supporting-arm into which the edge of the dial U is placed, and is slotted to permit a hook, F, to pass between its branches. This hook F is secured to the inside of the door of the case of the instrument, and is tilted back by a block, d, when the door is closed, so as to pass around the edge of the dial U. The block d is supported upon a spring, and has a sloping back, so that when the door is opened the hook F' pushes it downward and cuts a slit in the edge of the dial U. By the use of this contrivance a register is made of the opening of the case-door.

In order that the tell-tale drop may not be raised again after it has been sprung, I place it in an interior closed casing, h, within the main case Q, and set it by an arm which extends outside of this case and is locked to prevent tampering with it.

Having thus described my invention, what I claim as new, and desire to secure by Letters Patent, is—

1. In an electrical indicating apparatus, the combination of a motor, a motor-governing magnet, a registering or indicating magnet, a movable switch electrically connected with said magnets and operated by the said motor, and an indicating device or apparatus operated by the said registering or indicating magnet.

2. In an electrical indicating apparatus, the combination, with a registering or indicating magnet and an indicating device operated thereby, of a movable switch and means, comprising a governing-magnet, whereby the said switch may be set in operation from a distance, said switch being constructed to switch the current from the said governing-magnet to the said registering or indicating magnet.

3. In an electrical indicating apparatus, the combination of a motor, a single motor-governing magnet, a movable switch operated by said motor, and a series of stations all normally in electric communication with the said movable switch and motor-governing magnet.

4. In an electrical signaling or indicating apparatus, the combination, with a tell-tale or annunciator, of a magnet for operating the same, said magnet being in circuit with all of a series of signaling-stations ahead of the one to be normally signaled from.

5. In an electrical indicating apparatus, the combination of the registering-magnet and the adjustable marker-arm operated thereby, of the cylindrical switch having one of its poles in communication with the said registering-magnet, and a device rotating with said switch and connected with said arm, and thus adapted to control the position of the latter.

6. In an electrical indicating apparatus, the combination, with a dial and a time-movement for operating the same, of an adjustable marker-carrying arm, a motor separate from the said time-movement, and a rotary device, as cam C', operated by said motor and connected with the said marker-carrying arm, and thus adapted to control the position of the latter.

7. In an electrical indicating apparatus, the combination, with a dial and a time-movement for operating the same, of an adjustable punch or marker, a motor separate from the said time-movement, and connecting mechanism through which the said motor can control the position of the said punch or marker.

8. In an electrical indicating apparatus, a rotary switch having shunts all electrically connected together, but insulated from the main conducting-surface thereof.

9. In an electrical indicating apparatus, the combination of a cylindrical switch having a series of shunts all electrically connected together, but insulated from the surface of the cylinder, of a series of contact-pieces touching the surface of the cylinder, and so arranged relatively to said shunts that only one of the former will be in contact with a shunt at one time.

10. In an electrical indicating apparatus, the combination, with a movable switch having shunts insulated from the main conducting-surface thereof, of a motor for operating said switch, a motor-governing magnet in electrical communication with the said main conducting-surface and a series of contact-pieces normally touching the latter.

11. In an electrical indicating apparatus, the combination, with the contact-pieces representing the stations, of the rotary switch having the portion H insulated therefrom, the motor for operating said switch, the motor-governing magnet, a tell-tale or annunciator, and a magnet for operating the latter.

12. In an indicating apparatus, the combination of a registering-dial, a punch or marker, a movable arm by which the latter is carried, a motor, a motor-governing magnet in electrical communication with the several stations represented by the indicator, and connections through which the said motor can adjust the marker-carrying arm.

13. The combination, with a rotary indicating-dial, of a punch or marker and a carrying-arm which is movable toward and from the said dial in marking, and to which the said punch or marker is pivotally or flexibly connected, so that it is adapted to swing in the direction of the movement of the said dial, whereby the latter may move to a limited extent when the said punch is in contact therewith without being defaced thereby.

14. The motor having an intermittent action, in combination with the cam C', connecting-link l, and adjustable punch or marker arm M.

15. In a station-indicator, the combination of a registering-dial and time-movement, E, in combination with a registering punch or marker and a motor having an intermittent action which adjusts said punch or marker to said dial.

16. In a station-indicator, the combination of one or more of the contacts, $s'$ $s^2$ $s^3$ $s^4$ $s^5$ $s^6$ $s^7$, severally connected with the signaling-stations, with the shunt or shunts $n'$ $n^2$ $n^3$ $n^4$ $n^5$ $n^6$ $n^7$, which are all in communication with the registering-magnet.

17. In a station-indicator, the combination of a progressive switch with a cam or its equivalent and an adjustable punch or marker arm adapted to be operated thereby.

18. In a station-indicator, the combination of one or more of the contacts, $s$, which are in communication with the stations, with a conducting-plate which is in communication with a motor-governing magnet, the motor-governing magnet A, and motor D.

19. In a station-indicator, the combination of the contact-pieces, severally in communication with the stations, with a shunt or shunts, in communication with a registering-magnet, and the registering-magnet.

20. In an electrical indicating apparatus, the call-bell or alarm $S'$ in a local circuit, in combination with the registering-magnet, its armature, and a time-movement.

21. In a station-indicator, a time-movement, E, in combination with a circuit-closing lug, $g$, the latter being in a local circuit which includes an alarm, S.

22. In a station-indicator, the circuit-closing lug P, in combination with the motor D, the cylinder X X, contacts $f$ $f'$, and alarm S.

23. In a station-indicator, a local circuit comprising the contacts $g$ and $m$, lug P, contacts $f f'$, and alarm S.

24. In a station-indicator, the combination of the pivoted hook or cutter $F'$ and guide-arm F with the registering-dial U.

25. In a station-indicator, a dial-turning motor, in combination with the motor D, cylinder X X, provided with an electrical switch, and a registering-magnet in circuit with said switch.

WILLARD L. BUNDY.

Witnesses:
  FRANK M. BOWEN,
  FREDERICK I. ALLEN.